United States Patent
Haberbusch et al.

[11] Patent Number: 5,873,445
[45] Date of Patent: Feb. 23, 1999

[54] METHOD OF MANUFACTURING A DAMPING FLYWHEEL, NOTABLY FOR MOTOR VEHICLES

[75] Inventors: André Haberbusch, Poulainville, France; Alessandro Tessitore, Cengio, Italy

[73] Assignee: Valeo, Paris, France

[21] Appl. No.: 704,559

[22] PCT Filed: Jan. 11, 1996

[86] PCT No.: PCT/FR96/00044

§ 371 Date: Nov. 7, 1996

§ 102(e) Date: Nov. 7, 1996

[87] PCT Pub. No.: WO96/21812

PCT Pub. Date: Jul. 18, 1996

[30] Foreign Application Priority Data

Jan. 11, 1995 [FR] France ................... 95 00391

[51] Int. Cl.[6] ............ F16F 15/16; F16F 15/131
[52] U.S. Cl. ............ 192/208; 464/68; 29/527.1
[58] Field of Search ............... 192/208; 464/24, 464/66, 68, 7; 74/574; 29/527.1, 527.2; 184/105.2, 7.2

[56] References Cited

U.S. PATENT DOCUMENTS

| | | | |
|---|---|---|---|
| 5,146,811 | 9/1992 | Jackel | 464/66 X |
| 5,172,796 | 12/1992 | Campbell et al. | 192/3.29 |
| 5,242,328 | 9/1993 | Friedmann et al. | 464/24 |
| 5,435,783 | 7/1995 | Rohrle | 464/66 X |
| 5,575,182 | 11/1996 | Schierling et al. | 464/66 X |
| 5,575,183 | 11/1996 | Schierling et al. | 464/66 X |

FOREIGN PATENT DOCUMENTS

| | | |
|---|---|---|
| 0364219 | 4/1990 | European Pat. Off. |
| 0620380 | 10/1994 | European Pat. Off. |
| 2603678 | 3/1988 | France |
| 2626335 | 7/1989 | France |
| 2687442 | 8/1993 | France |
| 2695579 | 3/1994 | France |

OTHER PUBLICATIONS

Patent Abstracts of Japan, vol. 16, No. 206 (M–1248). 15 May 1992 & JP,A,04 0316474 (Hitachi Ltd) Feb., 1992.

Primary Examiner—Rodney H. Bonck
Assistant Examiner—Saúl J. Rodríguez
Attorney, Agent, or Firm—Longacre&White

[57] ABSTRACT

An apparatus and method of manufacturing a damping flywheel having two coaxial masses one of which is designed to be rotationally integral with a drive shaft such as the crankshaft of an internal combustion engine, while the other coaxial mass is designed to be connected with a driven shaft such as the input shaft of a gear box. The first mass includes a chamber that may be at least partially filled with a pasty or viscous agent and houses a circumferentially acting resilient member disposed between the two coaxial masses. The agent is deposited at the outer periphery of the first mass before the chamber is closed.

5 Claims, 2 Drawing Sheets

METHOD OF MANUFACTURING A DAMPING FLYWHEEL, NOTABLY FOR MOTOR VEHICLES

SUMMARY OF THE INVENTION

1. Field of the Invention

The present invention concerns damping flywheels, notably for motor vehicles, of the type having two coaxial masses, one of which is designed to be connected with respect to rotation to a drive shaft, such as the crankshaft of an internal combustion engine of a motor vehicle, and the other one of which is designed to be connected with respect to rotation to a driven shaft, such as the input shaft to a gearbox, of the type in which the first mass has a chamber able to be filled, at least partially, with a pasty or viscous agent and in which are housed circumferentially-acting elastic means, interposed between the said masses.

2. Description of the Prior Art

The present invention relates more particularly to a method of manufacturing such a flywheel, described for example in the document FR-A-2 603 678. In this document, before the damping flywheel is balanced, the first mass including the chamber is brought to a rotation speed which enables the pasty or viscous agent to be distributed around the periphery of the chamber at a radially internal level which is as constant as possible.

The at least partial filling, of the chamber can take place when the inertial mass is rotating.

In practice, the damping flywheel is pre-fitted before the chamber is filled.

This practice does not afford full satisfaction, since it notably requires an orifice to be provided for filling the chamber.

The object of the present invention is to overcome these drawbacks.

SUMMARY OF THE INVENTION

According to the invention, a method of manufacturing a damping flywheel of the type indicated above, in which the first mass has on its outer periphery an annular indentation for radially retaining directly or indirectly the circumferentially-acting elastic means is characterised in that the pasty or viscous agent is disposed evenly around the outer periphery of the said first mass before the chamber is closed.

There is thus no need to centrifuge the pasty or viscous agent.

In one embodiment, the grease is deposited using a greasing machine in the indentation or in a spout, advantageously divided into annular sectors, mounted in the said indentation, and then the circumferentially-acting elastic means are mounted.

In another embodiment, the springs are mounted in the said indentation or in the said spout, and then the grease is deposited on the springs.

In each case, the chamber is closed again, and then a balancing of the first mass takes place.

The simplicity of the method, which can be carried out with a rotary greasing machine, depositing for example the weight of grease required, will be appreciated. This deposition takes place evenly.

The description which follows illustrates the invention in conjunction with the accompanying drawings in which:

DETAILED DESCRIPTION OF THE PREFERRED EMBODIMENTS

Figure 1:
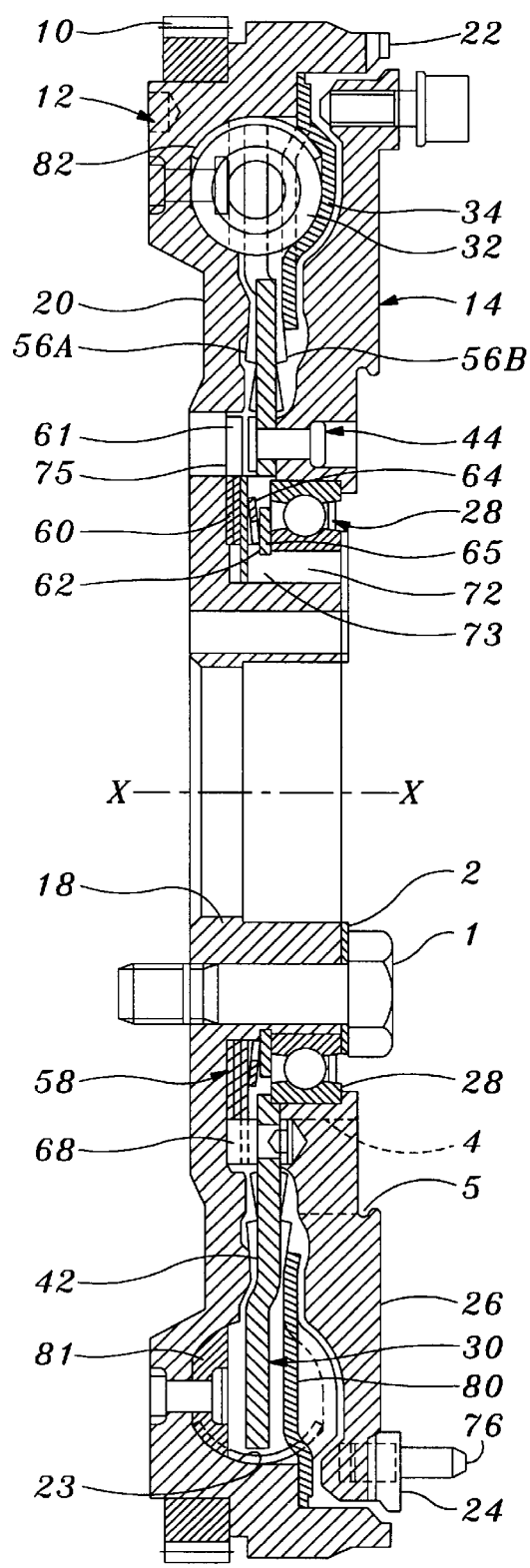
FIG. 1 is a view in axial section along the line 1—1 in FIG. 2 of a damping flywheel according to the invention.
Figure 3:
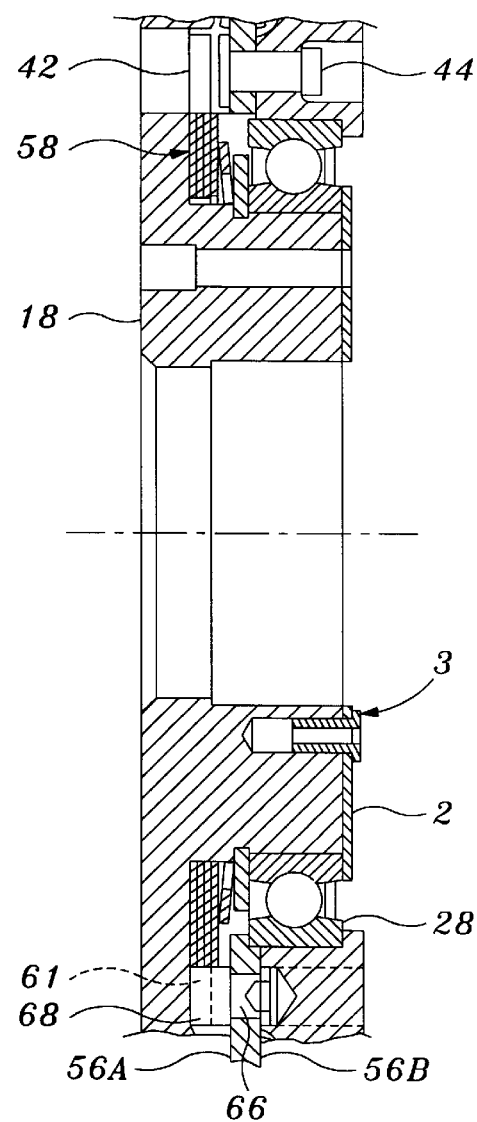
FIG. 3 is a partial view in cross section along the line 3—3 in FIG. 2.
Figure 2:
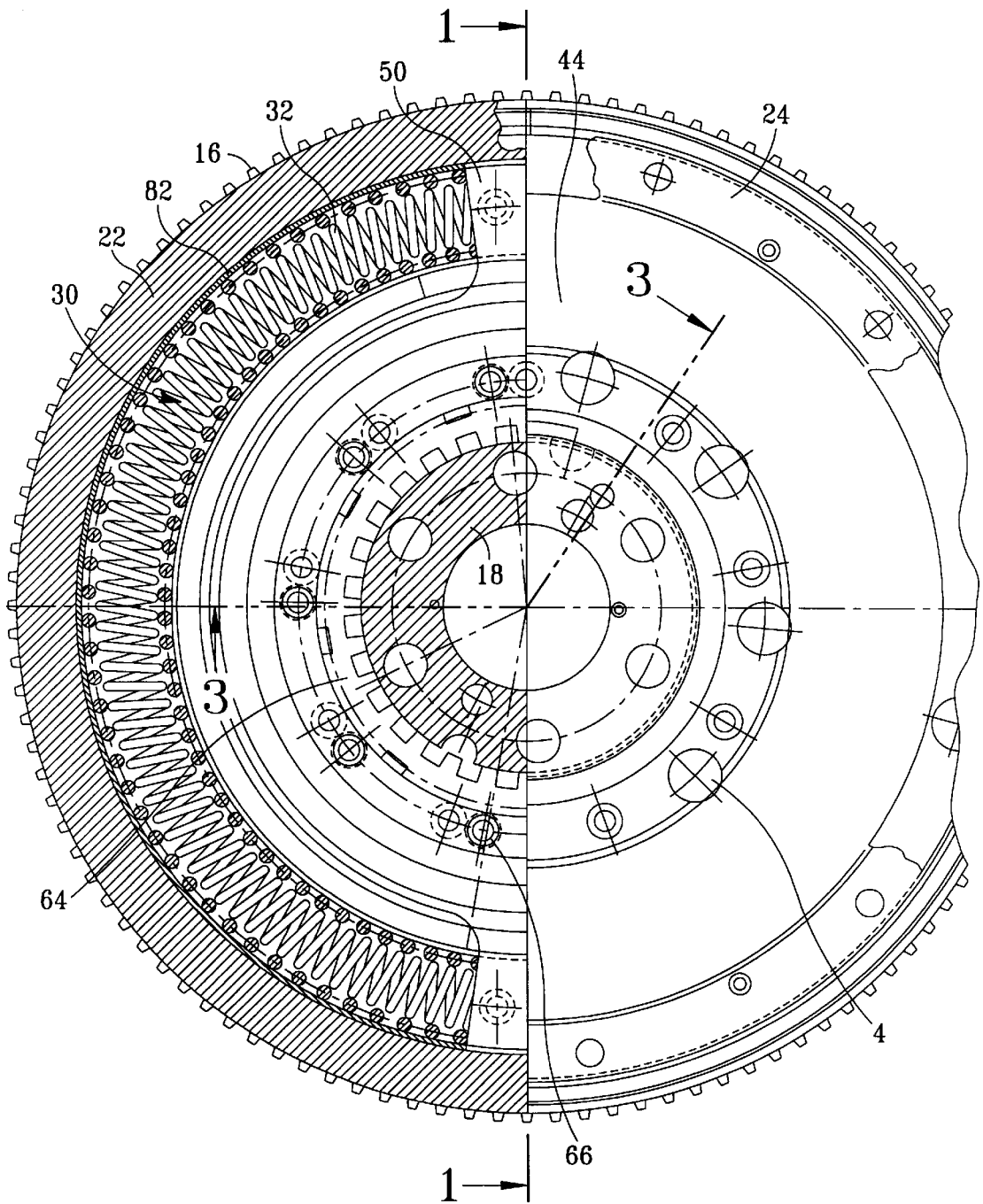
FIG. 2 is a view in partial cross section in the direction of the arrow 2 in FIG. 1.

In FIGS. 1 to 3, a damping flywheel for motor vehicles has been depicted which consists essentially of a first mass 12 (or first rotating element) and a second mass 14 (or second rotating element), which are movable with respect to each other about an axial symmetry axis X—X of the assembly.

In this case the masses 12 and 14 are coaxial and are mounted so as to be movable with respect to each other counter to circumferentially-acting elastic means 32 and an axially-acting friction device 58.

The first mass 12, which is in the form of a plate in this case, carries a starting ring 16 suitable for cooperating with the starter (not shown) of the vehicle. This plate has on its inner periphery, of a single piece, a central hub 18, and on its outer periphery an axially oriented peripheral annular skirt 22.

The plate 20, of a single piece with its skirt 22 and its hub 18, is made of a castable material, cast iron in this case.

The first mass 12 is therefore designed to be fixed on the end of the crankshaft of the internal combustion engine in the manner described hereinafter.

This first mass 12 is therefore designed to be fixed with respect to rotation on a drive shaft, being fixed thereto in this case by screws 1.

The second mass 14 is also made of a castable material, in this case of cast iron, and has a reaction plate 26 with, on its outer periphery, an axially oriented cylindrical skirt 24, fragmented in this case, surrounded by the skirt 22 of the first mass 12.

The second mass 14 is rotatably mounted on the hub 18 of the first mass 12 in this case by means of a ball bearing 28 or as a variant by another bearing for example of the plain bearing type.

The first mass 12 defines for the most part on its outer periphery an annular housing (or chamber) 30, which is designed to receive the circumferentially-acting elastic means 32, formed in this case by a set of helical springs, concentric in this case, arranged in a ring.

In this case, two sets of concentric springs 32 are provided. This number does, of course, depend on the application.

The housing 30 is defined in this case for the most part by the plate 20, the skirt 22 and a disc 34 belonging to the first mass.

On its inner periphery this chamber 30 shows a small slot penetrated by a disc 42 belonging to the second mass, in a fluidtight manner as described hereinafter.

The disc 34, made of metal in this case, extends towards the inside from the skirt 22 between the two plates 20, 26, radially towards the inside.

The disc 34 is rotatably linked to the outer skirt 22 by airtight crimping as described in the document FR-A-2 695 579. To this end, the skirt 22 has a shoulder and its shoulder has a groove designed to receive the metal of the metal disc when the latter is crimped.

As a variant, this fluidtight fixing can be effected by screwing as described in the document FR-A-2 687 442.

As a variant, riveting or welding can be used. This disc 34 forms a hollow cover for the plate 20, being delimited by its skirt 22 and hub 18.

The plate 26 is hollowed out to house the disc 34, which is pressed out locally at 80 (FIG. 1) to support the circumferential ends of the helical springs 32.

Opposite these pressed parts 80 the plate 20 has inserts 81 fixed by riveting to the said plate to support the circumferential ends of the said springs.

The disc 34 and plate 20 define an annular channel for the springs 32. To this end the plate 20 is hollowed annularly on its outer periphery and the disc 34 is curved so as to retain the springs axially and radially.

The skirt 22 is hollowed on the inside to retain the springs 32 radially.

To this end, its internal bore has an annular indentation 23. The plate 20, skirt 22 and disc 34 thus match the shape of the springs 32, in this case the shape of the outer springs.

The second mass 12 also includes a disc 42, called the lower disc, which is connected to it in rotation by rivets 44 and which extends radially from the inner periphery of the plate 26 to the housing or annular chamber 30. This chamber 30 is, in this case, filled partially with a pasty or viscous agent to lubricate the springs 32.

In a manner known per se, the plate 26 forms the reaction plate of a clutch.

Thus the second mass 14 is designed to be fixed with respect to rotation to a driven shaft, in this case the input shaft of the gearbox, by means of the friction disc of the clutch (not shown), whose friction linings are designed to be gripped between the reaction plate 26 and a thrust plate (not shown) belonging to the mechanism in the clutch, the said mechanism being designed by virtue of its cover to be fixed by screws, one of which can be seen in the upper part of FIG. 1, to the reaction plate 26.

The outer edge of the inner disc 42 has radial lugs 50, in this case two lugs diametrically opposite each other overall, designed to serve as a stop for the circumferential ends of the springs 32.

Thus the disc 42 penetrates the housing 30 and the springs 32, bearing on the inserts 81 and the pressed parts 80 of the disc 34, are designed to be compressed by the lugs 50.

In this case anti-wear parts 82, here in the form of a spout, are interposed radially between the springs 32 and the inner periphery of the skirt 22.

More precisely, these spouts 82 with a cross section in the shape of an arc of a circle are received in the annular indentations 23. The spouts 82 extend in this case overall over 90°, matching the shape of the indentations 23, in this case an indentation 23 fragmented by the parts 81.

The springs 32 are therefore designed to make contact with the spouts 82, made of steel in this case, under the action of centrifugal force. The first mass 12 therefore has an annular indentation to retain the springs 32 radially, in this case indirectly by means of the spouts 82.

There exists a slight gap between the plate 20 and the inner periphery of the disc 34 for the entry of the disc 42.

The internal sealing of the annular housing is effected by two sealing washers 56A, 56B. These washers 56A, 56B are two annular pieces made of sheet metal, cut out and stamped. They are elastic.

The washers 56A, 56B close off the housing 30 at its inner periphery, the said housing being filled partially with a pasty or viscous agent to lubricate the springs 32 in the manner described hereinafter.

More specifically, the outer rim of the washer 56A bears elastically against a bearing surface formed opposite in the plate 20 of the first mass 12, while the outer radial edge of the second sealing washer 56B bears elastically against a bearing surface formed opposite at the inner periphery of the disc 34 of the first mass 12.

The washers 56A and 56B are disposed on each side of the disc 32 and apposed thereto.

The damping flywheel also includes a friction device acting axially between the two masses.

This device 58 surrounds the hub 18 and includes a friction washer 60, in this case made of plastic reinforced with fibres, which is designed to rub on a portion of flat surface of the plate 20 and through a ring 62, made of metal in this case, rotated by the hub 18.

An axially-acting elastic washer 64 elastically pushes the washer 62 to bear against the washer 60.

The ring 64, of the Belleville washer type in this case, or as a variant of the crinkle washer, bears upon a ring 65 fixed axially on the inner ring of the ball bearing 28 fitted onto the hub 18.

This hub 18 is provided with passage holes for screws 1 for fixing the damping flywheel on the crankshaft of the engine.

Such a screw 1 can be seen in the central part of FIG. 1.

The screws 1 bear through their head on a washer 2 serving to fix the inner ring of the bearing 28 axially in one direction.

In the other direction this inner ring is fixed axially by the aforementioned ring 65, which can consist of a circlip engaged in a groove in the hub 18.

Thus the damping flywheel is arranged between two rotating assemblies, one of which (the crankshaft) is connected to the internal combustion engine of the vehicle and the other one of which is connected (disengageably) to the input shaft of the gearbox.

The washer 60 has on its outer periphery an annulus provided with notches 61. These notches or recesses 61 are designed to cooperate with heads 68 of a series of rivets 66, which are fixed on the inner annular disc 42 of the second mass 14.

As can be seen in FIG. 2, the inner radial edge of the sealing washer 56A is gripped between the head 68 of each rivet 66 and the portion of the flat surface of the disc 42, made of metal in this case.

Thus the first sealing washer 56A is fixed on the disc 42 and its inner radial rim has to this end a series of holes through which the bodies of the rivets 66 pass.

In addition to rotating the washer 62 through cooperation of the heads 68 with the edge of the recesses 61 associated with the washer 60, this arrangement enables the sealing washer 56A to be fixed on the disc 42.

This design enables the sealing washer 56A to be mounted on the disc 42 before the said disc 42 is fixed on the plate 26 of the second mass 14 by means of a series of connecting rivets 44.

These rivets 44, located at the inner periphery of the plate 26, just like the rivets 66, have the sole function of fixing the disc 42 without fixing the sealing washers 56A, 56B which are thus provided.

Advantageously, the second sealing washer 56B is fixed in the same manner as the sealing washer 56A by means of the fixing devices 66.

Thus the inner radial edge of the sealing washer 56B is gripped between the foot of each rivet 66 and the opposite portion of the disc 42.

This inner radial edge has holes through which pass the bodies of the rivets 66.

Thus the radial edges of the washers 56A, 56B extend in contact with the disc 42 and on each side thereof, the assembly forming a captive assembly able to be handled and transported.

As can be seen in FIG. 2, the fixing rivets 66 and the connecting rivets 44 are advantageously arranged substantially on the same circle and alternate regularly along this circle.

The second mass 14 has hollow parts opposite the feet of the rivets 66 for the passage of the said feet. The disc 42 fixes the outer ring of the bearing 28 axially between a shoulder of the second mass 14 and the inner periphery of the disc 42 which, like the disc 34, has a central hole.

For the record, it should be stated that, during the operation of the damping flywheel, the springs are allowed to be compressed between the arms 50 of the disc 42 and all the abutments of the inserts 81 of the plate 20 and the pressed parts 80 of the disc 34 of the first mass 12.

During this movement, the head 68 of the rivets 66 causes the washer 60 to rotate with friction appearing between the washer 60 and the plate 20.

Another friction occurs between the washer 60 and the washer 62 which is fixed with respect to rotation on the first mass by a connection of the tenon and mortise type.

To this end, the washer 62 has on its inner periphery lugs 73 engaged in a complementary manner in grooves 72 formed in the hub 18.

There is thus a friction rated by the elastic washer 64. Of course, the disc 34 has a hole at its centre and extends radially above the rivets 44, 66.

It will be noted that the plate 26 has on its inner periphery a plurality of holes 4 designed to ventilate the damping flywheel.

Air can thus flow between the two plates 20 and 26. This ventilation assists the cooling of the bearing 28, the holes being located near the bearing 28. These holes 4 alternate with the rivets 66 and 44.

According to one characteristic these holes open out into a groove 5 in the reaction plate 26 at its inner periphery. This groove is designed to collect the oil escaping from the centre of the friction disc, so as not to contaminate the friction linings of the said friction disc.

Thus the holes 4 have a dual function, namely a function of ventilation and of collecting oil coming for example from oil leaks occurring in the gearbox, the said oil passing notably through the hub fixed with respect to rotation on the input shaft of the gearbox, the said hub belonging to the friction disc.

The oil is thus centrifuged into the groove 5 and is evacuated through the holes 4. There is no risk of the friction face which the plate 26 offers to the affected friction lining of the friction disc being contaminated.

It will be noted that the washer 2 serving to support the heads of the fixing screws 1 is fixed independently to the hub 18 by means of "pop" rivets or pins fitted into the hub 18.

According to the invention, a method of manufacturing a damping flywheel of the above type is characterised in that the pasty or viscous agent is deposited at the outer periphery of the first mass before the chamber or housing 30 is closed. This deposition takes place evenly in this case in the vicinity of the skirt 22 and more specifically the semi-toric indentation 23 thereon. In this case the aforementioned agent consists of pasty grease.

When the flywheel has no spout 82, the grease is deposited evenly using a greasing machine 100 in the indentation 23.

As a variant, when the flywheel has spouts 82 the spouts are first mounted in the indentations 23 and then the grease is deposited evenly in the spouts 82.

In another embodiment, the springs 32 are mounted in the indentations 23 or in the spouts 82, depending on the application, and then the grease is deposited evenly on the springs.

Advantageously, this deposition is carried out using a greasing machine 100.

For example when the flywheel is equipped with two spouts 82 the grease is deposited evenly in each spout 82 by performing a half-turn.

To this end, the machine has two receptacles 101, 102 each communicating with a nozzle 103, 104 which enables the grease to be injected (or deposited) in the spouts 82.

Inside each receptacle 101 there is mounted a piston 105, 106.

Figure 4:
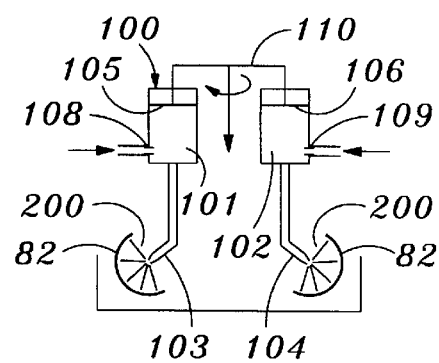
FIG. 4 is a diagrammatic view of the greasing machine.

These pistons 105, 106 are coupled together by a mechanism 110 thus adapted by this mechanism to perform a rotational and translational movement as depicted by the arrows in FIG. 4.

Initially the pistons 105, 106 are in the high position and the receptacles 101, 102 are filled with grease by means of openings 108, 109 formed in their lower part.

With these openings 108, 109 there are associated unidirectional valves.

Thus initially grease is injected through the openings 108, 109 into the receptacles 101, 102, which raises the pistons 105, 106.

Then by means of the mechanism 110 the pistons 105, 106 are lowered by importing a rotational movement to the receptacles 101, 102, thereby enabling grease to be deposited evenly by means of the nozzles 103, 104 or plugs in the spouts 82. An even annular bead is thus deposited in the spouts 82.

As a variant, it is possible to mount the springs 32 first in the spouts 82 in the aforementioned manner and to inject the grease using the grease machine 100 at the inner periphery of the springs 32, and more generally over the accessible part thereof.

In each case, the necessary quantity of grease is injected continuously using the receptacles 101, 102, so that balancing is obtained from the start.

To this end, the weight of the grease contained in the receptacles 101 and 102 is checked.

When the pistons 105, 106 fall, it is checked that the weight of the grease falls within the limits of tolerance of the weight of the grease.

If the weight is not correct, an alarm is triggered.

In this case the method of manufacturing the flywheel in FIGS. 1 and 3 is performed in the following manner:

- in a first operation, the sealing washers 56A, 56B are fixed to the disc 42 by means of the rivets 66. This operation is performed on a press;
- in a second operation, the inserts 81 are sealingly riveted to the plate 20 by means of a press;
- in a third operation, the friction device 58 is mounted with these washers 60, 62, 64, 65 on the hub 18, and then this friction device is honed, by actuating the washer 60 by means of its recesses 61, in a fourth operation;

in a fourth operation, the spouts 82 are put in place in the indentation 23, and then the springs 32 are placed in the spouts 82 and the grease is deposited on the springs 32 by means of the machine 100 in FIG. 4, to form a continuous bead.

The fitted-out disc 42 is then positioned and then the chamber 30 is closed off by the disc 34 by means of a crimping operation using a press or a screwing operation by means of a special machine according to the mode of fixing the disc 34 to the skirt 22.

The pins 76 are then fitted onto the flywheel 26, the said pins 76 being designed to centre the cover of the clutch mechanism.

This takes place on a press.

In a following step, the outer ring of the bearing is fitted onto the flywheel 26 and more precisely the said outer ring is fitted into the inner bore of the flywheel 26 on a press.

The bearing 28/plate 26 assembly is then fitted onto the hub 18 of the first mass 12.

All these fitting operations take place on a press.

Finally the disc 42 is fixed by riveting, on a press.

After this operation, plugs 75 are used to mask the openings which are situated congruently with the rivets 44 in order for the said riveting to take place.

Naturally a final check can take place.

Naturally the present invention is not limited to the example embodiment described, and in particular the number of springs depends on the application.

The machine 100 can perform a complete turn and have only a single receptacle.

It will be understood that the configuration of the hollow plate 20, and notably of its skirt 22, optionally fixed thereto for example by riveting, crimping or welding, is exploited.

By virtue of the invention it is possible to check the weight of the springs and spouts 82 before grease is applied, and trigger an alarm if necessary.

Of course, the presence of the spouts is not essential, the indentation 23 being able to hold the springs 32 directly radially.

We claim:

1. Method of manufacturing a damping flywheel comprising first and second coaxial masses (12, 14), said first mass (12) is designed to be connected with respect to rotation to a first drive shaft, and the second coaxial mass (14) is designed to be connected to a second driven shaft, the first coaxial mass (12) has a chamber (30) able to be filled, at least partially, with a viscous agent and in which are housed circumferentially-acting elastic means interposed between said first and second masses, and the first mass (12) has on its outer periphery an indentation for radially retaining the circumferentially-acting elastic means (32), said method comprising the step of depositing the agent evenly around the outer periphery of the first mass (12) before the chamber (30) is closed by means of a greasing machine.

2. Method of manufacture according to claim 1, in which the first mass (12) has at its outer periphery a skirt (22) provided with at least one indentation (23), said method comprising the step of depositing said viscous agent in said indentation.

3. Method of manufacture according to claim 1, wherein the first mass (12) has at its outer periphery a skirt (22) provided with at least one indentation (23), in which spouts (82) designed to retain the circumferentially-acting elastic means (32) radially are mounted, wherein said step of depositing the agent includes depositing said viscous agent in said spouts (82).

4. Method of manufacture according to claim 1, in which the first mass (12) has on its outer periphery a skirt (22) provided with at least one indentation (23), in which spouts (82) designed to retain the circumferentially-acting elastic means (32) radially are mounted, wherein circumferentially-acting elastic means (32) are mounted in the said spouts (82) and said step of depositing said agent includes depositing said viscous agent on said elastic means (32).

5. Method of manufacture according to claim 1, wherein the greasing machine has at least one receptacle (101, 102) communicating with a nozzle (108, 109) designed to deposit the viscous agent, a piston (105, 106) being mounted in the said receptacle to discharge the said agent.

* * * * *